Figure 1:
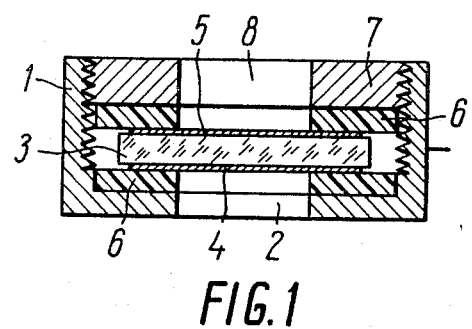

United States Patent [19]
Kozlov

[11] 3,858,047

[45] Dec. 31, 1974

[54] DEVICE FOR MEASURING THE RATE OF ENERGY LOSS AND FOR DETECTING IONIZING NUCLEAR RADIATIONS AGAINST GAMMA-RADIATION BACKGROUND

[76] Inventor: Stanislav Fedorovich Kozlov, B Akademicheskaya, 49, korpus I, kv. 18, Moscow, U.S.S.R.

[22] Filed: Mar. 30, 1973

[21] Appl. No.: 347,449

Related U.S. Application Data

[63] Continuation of Ser. No. 861,913, Sept. 29, 1969, abandoned.

[30] Foreign Application Priority Data

Sept. 27, 1968  U.S.S.R. ............................. 1273640

[52] U.S. Cl. .............................................. 250/370
[51] Int. Cl. ............................................... G01t 1/24
[58] Field of Search ........................... 250/370, 390

[56] References Cited
UNITED STATES PATENTS

| | | |
|---|---|---|
| 2,694,112 | 11/1954 | McKay........................... 250/370 X |
| 2,760,078 | 8/1956 | Youmans........................... 250/261 |
| 3,201,590 | 8/1965 | Sun..................................... 250/370 |
| 3,665,193 | 5/1972 | Kozlov et al....................... 250/370 |

*Primary Examiner*—Archie R. Borchelt
*Attorney, Agent, or Firm*—Waters, Roditi, Schwartz & Nissen

[57] ABSTRACT

A device for measuring rates of energy loss and for detecting ionizing nuclear radiation against a gamma-radiation background. The nuclear radiation detector is essentially a diamond crystal plate with contacts disposed on its opposite sides and made of a material having an atomic number not exceeding 15, one of said contacts injecting charge carriers and being connected to a detector power supply, while the opposite contact has blocking characteristics in relation to charge carriers and is connected to the input of an amplifier with means for recording output signals.

5 Claims, 2 Drawing Figures

DEVICE FOR MEASURING THE RATE OF ENERGY LOSS AND FOR DETECTING IONIZING NUCLEAR RADIATIONS AGAINST GAMMA-RADIATION BACKGROUND

This application is a continuation of Ser. No. 861,913, filed Sept. 29, 1969, and now abandoned.

The present invention relates to devices for measuring the rates of energy loss and for detecting ionizing nuclear radiation.

There is widely known a device for measuring the rate of energy loss $dE/dx$ of nuclear radiation, comprising a silicon detector as an element sensitive to nuclear radiation, a detector power supply and an amplifier with means for recording output signals.

A limitation of this device is its high noise level at room temperature. Another limitation is that silicon detectors sometimes do not provide a required valve of energy resolution. This results, for instance, from scattering due to the high atomic number Z of silicon and is particularly essential when measuring the rate of energy loss for electrons. In addition, because of the high atomic number of silicon, a device with a silicon detector is rather sensitive to a gamma-radiation background.

It is an object of the present invention to provide an improved device for measuring rates of energy loss and for detecting ionizing nuclear radiation, which will insure good energy resolution when measuring the rate of energy loss and allows ionizing nuclear radiations to be detected with high efficiency against a background of intensive isotropic gamma-ray fluxes.

In the accomplishment of the above and other objects of the invention, in a device for measuring rates of energy loss and for detecting ionizing nuclear radiations against a gamma-radiation background, comprising a nuclear radiation detector with an amplifier and means for recording output signals and a detector power supply, according to the invention, a detector is used which is essentially a diamond crystal plate with contacts formed at the opposite sides thereof and designed for applying an electric field to said plate. The thickness between said contacts is such that it does not exceed the distance travelled by charge carriers in the diamond crystal under the influence of an applied electric field and less than the range of incident nuclear radiation. The contact disposed on the plate side which is adapted to be irradiated is formed by a layer permeable to incident nuclear radiation and made of a material with an atomic number not exceeding 15. It is blocking in relation to charge carriers and is connected to the input of an amplifier with recording means. The opposite contact on the plate side which is not adapted to be irradiated is formed by a layer permeable to incident nuclear radiation and made of a material with an atomic number not exceeding 15. It is capable, in conjunction with a diamond, of injecting charge carriers under the influence of an applied electric field and is connected through a resistor to a power supply.

Figure 2:
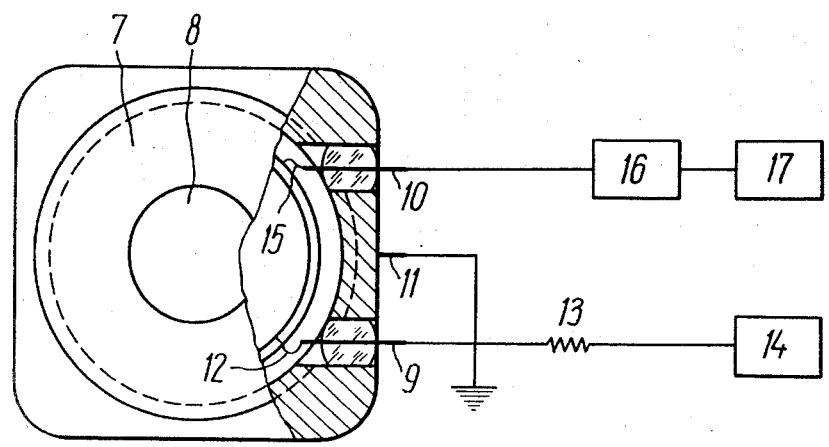

For a better understanding of the invention, there is presented hereinbelow a description of an exemplary embodiment thereof with reference to the accompanying drawings, in which:

FIG. 1 is a diagrammatic section of a device for measuring rates of energy loss and for detecting ionizing nuclear radiation against a gamma-radiation background in accordance with the invention; and FIG. 2 is a top view of the same device partially broken away.

In a housing 1 (FIG. 1) with a window opening 2 is mounted a nuclear radiation detector 3, which is essentially a diamond crystal plate, on whose opposite sides contacts 4 and 5 are provided. The contact 4 is made blocking in relation to charge carriers. The opposite contact 5 is made of a material capable, in conjunction with a diamond, of injecting charge carriers under the influence of an applied electric field. The thickness d of the operating range of the diamond crystal plate disposed between the contacts 4 and 5 does not exceed the distance travelled by charge carriers in the diamond crystal under the influence of an applied electric field and may be found from $$d \le \delta = \eta\tau E,$$

where $\eta$ is the mobility of charge carriers (electrons or holes), $\tau$ is the lifetime of charge carriers, E is the applied field strength, $\delta$ is the distance travelled by charge carriers under the influence of the applied electric field.

For insuring negligible energy losses of incident nuclear radiation in the diamond detector 3 when measuring the rate of energy loss, it is necessary that the thickness of the blocking contact 4 and the injecting contact 5 be as low as possible, while the operating range of the diamond crystal plate between these contacts should be less than the range (the depth of penetration) of incident nuclear radiation.

When measuring the intensity of ionizing nuclear radiation against a background of powerful isotropic gamma-ray fluxes, it is also desirable to use a diamond detector having the blocking and injecting contacts permeable to incident nuclear radiation and a very thin operating range between these contacts. Further, it is advantageous that these contacts should be made of material with an atomic number not exceeding 15, such as silicon carbide, graphite and so forth. This provides a low absorption coefficient for gamma-rays and decreases the contribution to pulse counting made by electrons due to gamma-ray absorption in the contacts, i.e., decreases the action of the contacts as gamma-radiation converters.

A decrease of the thickness of the detector operating range results in reducing the amplitude of pulses arising from bombardment with nuclear radiation to be detected, since it passes through the detector losing therein a small part of its energy. However the absorption of gamma-rays inside the detector operating range decreases exponentially and, hence, their contribution to counting reduces.

When the thickness of the diamond detector is decreased, its leakage currents do not enhance owing to the high resistivity and high forbidden energy gap of the diamond. Consequently, since the diamond detector has negligible thermal and current noise, it is possible to reduce its sensitivity to gamma radiation significantly by making the diamond crystal plate with a thickness of the operating range, which is much less than the range (the depth of penetration) of nuclear radiation to be detected.

The diamond detector 3 is fixed in the housing 1 by means of two similar thin insulating gaskets 6 and a nut 7 screwed into the housing. There are window openings 8 in the gaskets 6 and in the nut 7, similar to and aligned with the window opening 2 in the housing 1.

The housing has two separate metal leads 9 and 10 (FIG. 2), insulated from the housing with suitable metal-insulator seals. The housing is made of a material with a low atomic number, such as aluminum, and is grounded by a lead 11. The lead 9 is connected by a wire 12 to the injecting contact 5 of the diamond detector 3 and serves for applying a voltage to the diamond detector 3 through a resistor 13 from the power supply 14. The lead 10 is connected by a wire 15 with the blocking contact 4 of the diamond detector 3 and serves for transmitting the detector signals to an amplifier 16 with recording means 17.

Diamond crystal plates with a recess are particularly suitable for manufacturing the proposed device with a very narrow operating range, since they have greater mechanical strength and are more convenient in handling. However, it is possible to use diamond detectors in the form of thin plates by first gluing them around the periphery of appropriate adapters with window openings and then mounting them inside the housing as described above.

If required, for instance, in studies on identification of particle type, it is possible to mount an extra detector, which gives full absorption, inside the housing (not shown) and to obtain a compound system of dE/dx and E detectors.

For increasing the detecting area, a mosaic may be composed of said diamond detectors for nuclear radiation.

In the proposed device, said diamond detector may also be encapsulated in a layer of epoxy resin, glue or other such compound.

The present device with the diamond detector operates in the following manner. The housing 1 is inserted in an appropriate connector (not shown) and placed across a beam of nuclear radiation under investigation. Direct voltage is applied to the diamond detector 3 from the power supply 14. Nuclear radiation to be detected penetrates the diamond detector 3 from the side of its blocking contact 4 and causes ionization inside the detector. The resulting charge carriers (electrons and holes) move to the contacts 4 and 5 under the influence of the applied electric field. The electrons travel to the injecting contact 5, if a positive potential is applied to it. The holes travel to the blocking contact 4. On their movement to the contact 5, some electrons are trapped by traps always present in the diamond crystal. As a result, the diamond crystal plate polarizes. The injecting contact 5 is designed to remove said polarization. Since deep traps are present in the diamond, the injection currents from the contact 5 are limited by the space charge accumulated by these traps. Thus, the injection currents do not induce significant conductivity and, consequently, noise. However, when field and charge equilibrium inside the diamond crystal plate is disturbed due to polarization created by incident ionizing radiation, the charge carriers (holes) injected by the contact 5 restore the initial steady state of the crystal.

Some holes travelling to the contact 4 may also be trapped. In this case, however, the trapped holes are in the ionization zone and can be neutralized by the charge carriers of the opposite sign, i.e., by electrons. In addition, when detecting heavily ionizing radiation, losses in the electron-hole plasma are reduced, since the field strength is higher in the vicinity of the blocking contact 4.

The signal removed from the blocking contact 4 of the diamond detector 3 is fed to the input of the amplifier 16 and then to the recording means 17.

The present device with the diamond detector has a number of advantages over the known devices. Said connection circuit for the diamond detector having a low capacitance and a low noise level and being provided with the contacts permeable to incident nuclear radiation insures a decrease in the total input capacitance of the device and enhances the signal to noise ratio. This results in increasing the detection efficiency. Since the detector is made of a diamond with a low atomic number and has the blocking and injecting contacts formed by materials with a low atomic number, the device possesses low sensitivity to gamma radiation and low scattering. This allows the rate of energy loss to be measured with good energy resolution, and ionizing nuclear radiations such as alpha and beta rays to be detected against the background of intensive gamma-radiation fluxes with high $\alpha/\gamma$ and $\beta/\gamma$ ratios.

I claim:

1. A device for measuring the rate of energy loss and for detecting ionizing nuclear radiations against a gamma-radiation background, comprising in combination: a housing; a diamond nuclear radiation detector mounted in said housing, said detector comprising a diamond crystal plate including contacts formed at the opposite sides thereof and designed for the applying of an electric field to said plate when detecting ionizing nuclear radiations, one of said contacts being located on the irradiated side of said plate and being constituted as a blocking contact in relation to the charge carriers and the opposite contact being constituted of a material capable, in conjunction with the diamond crystal plate, of injecting the charge carriers under the influence of the electric field, the thickness of the plate between said contacts being no greater than the maximum drift length of the charge carriers created by the nuclear radiation in the diamond crystal plate under the influence of the applied electric field corresponding to the maximum drift rate; an amplifier having an input connected to said blocking contact; means for recording output signals; a detector power supply connected to said injecting contact of the diamond detector, the blocking and injecting contacts of said detector being constituted as layers permeable to incident nuclear radiation and of a material having an atomic number less than 15 and the thickness of the diamond crystal plate being less than the range of incident nuclear radiation, said thickness being d in the equation $$d \leq \delta = \eta \tau E,$$

where $\eta$ is the mobility of charge carriers, $\tau$ is the lifetime of charge carriers, E is the applied field strength, $\delta$ is the distance travelled by charge carriers under the influence of the applied electric field.

2. A device as claimed in claim 1 wherein said contacts are graphite.

3. A device as claimed in claim 1 wherein said contacts are silicon carbide.

4. A device as claimed in claim 1 wherein said housing has a threaded opening in which said detector fits, comprising a threaded nut to close said opening and hold the detector in said housing.

5. A device as claimed in claim 4 comprising leads extending through said housing to said contacts and a lead grounding said housing.

* * * * *